(12) United States Patent
Tazbaz et al.

(10) Patent No.: US 10,126,785 B2
(45) Date of Patent: Nov. 13, 2018

(54) CAM LOCK HINGE FOR DETERMINANT MOVEMENT

(71) Applicant: Microsoft Technology Licensing, LLC, Redmond, WA (US)

(72) Inventors: Errol Mark Tazbaz, Bellevue, WA (US); Gary Russell McClary, Palisade, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 15/234,724

(22) Filed: Aug. 11, 2016

(65) Prior Publication Data

US 2018/0044958 A1    Feb. 15, 2018

(51) Int. Cl.
*G06F 1/16* (2006.01)
*E05D 11/10* (2006.01)
*E05D 3/12* (2006.01)
*E05D 11/00* (2006.01)

(52) U.S. Cl.
CPC ............ *G06F 1/1681* (2013.01); *E05D 3/12* (2013.01); *E05D 11/0081* (2013.01); *E05D 11/1014* (2013.01); *G06F 1/1615* (2013.01); *G06F 1/1616* (2013.01); *G06F 1/1679* (2013.01); *G06F 1/1683* (2013.01); *E05Y 2900/606* (2013.01); *G06F 1/1643* (2013.01)

(58) Field of Classification Search
CPC .... G06F 1/1681; G06F 1/1683; G06F 1/1616; G06F 1/1615
See application file for complete search history.

(56) References Cited

U.S. PATENT DOCUMENTS

| | | | |
|---|---|---|---|
| 7,512,426 B2 | 3/2009 | Maatta et al. | |
| 8,126,516 B2 | 2/2012 | Johnston et al. | |
| 8,687,354 B2 | 4/2014 | Uchiyama et al. | |
| 8,875,349 B2 | 11/2014 | Hanigan | |
| 9,290,976 B1 | 3/2016 | Horng | |
| 2004/0266239 A1 | 12/2004 | Kurokawa | |

(Continued)

FOREIGN PATENT DOCUMENTS

| | | | |
|---|---|---|---|
| CN | 103291737 A | | 9/2013 |
| JP | 2016038040 A | * | 3/2016 |

OTHER PUBLICATIONS

"International Search Report and Written Opinion Issued in PCT Application No. PCT/US2017/045398", dated Oct. 26, 2017, 11 Pages.

(Continued)

*Primary Examiner* — Nidhi Thaker
(74) *Attorney, Agent, or Firm* — Ray Quinney & Nebeker, P.C.; Paul N. Taylor; Qudus Olaniran

(57) ABSTRACT

A hinge for providing determinant motion in an electronic device includes a first body, a second body, and a lock. The lock includes a first cam connected to the first body and a second cam connected to the second body. The first cam has a first cam surface and the second cam has a second cam surface. The follower is positioned and moveable between the first cam and the second cam and is configured to be received by the first cam surface and the second cam surface. The first cam is rotatable about a first pivot point and the second cam is rotatable about a second pivot point.

20 Claims, 10 Drawing Sheets

(56) References Cited

U.S. PATENT DOCUMENTS

| | | |
|---|---|---|
| 2010/0149764 A1* | 6/2010 | Ueyama ................ G06F 1/1681 361/749 |
| 2012/0047685 A1 | 3/2012 | Ma et al. |
| 2013/0135809 A1 | 5/2013 | Uchiyama et al. |
| 2013/0318746 A1* | 12/2013 | Kuramochi ........... G06F 1/1681 16/342 |
| 2015/0185788 A1 | 7/2015 | Matsuoka |
| 2015/0227175 A1* | 8/2015 | Motosugi .............. G06F 1/1681 16/341 |
| 2015/0362956 A1 | 12/2015 | Tazbaz |
| 2016/0041589 A1 | 2/2016 | Tazbaz |
| 2016/0132076 A1 | 5/2016 | Bitz et al. |
| 2018/0059735 A1* | 3/2018 | Tazbaz ................. G06F 1/1681 |
| 2018/0066465 A1* | 3/2018 | Tazbaz ................ E05D 11/1007 |
| 2018/0067520 A1* | 3/2018 | Maatta ................. G06F 1/1681 |

OTHER PUBLICATIONS

Purcher, Jack, "Details behind Microsoft's Patent Pending Surface Book Hinge was published by USPTO last Week", Published on: Feb. 16, 2016, Available at: http://www.patentlyapple.com/patently-apple/2016/02/details-behind-microsofts-patent-pending-surface-book-hinge-was-published-by-uspto-last-week.html.

Beck, Kevin, "Evolution of the Yoga 900S Hinge", Published on: Jan. 4, 2016, Available at: http://blog.lenovo.com/en/blog/evolution-of-the-yoga-900s-hinge/.

\* cited by examiner

CAM LOCK HINGE FOR DETERMINANT MOVEMENT

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer.

Some hybrid computers are clamshell devices that are used in different orientations. For example, some hybrid computers may be oriented with a touch-sensitive surface laid flat against the table or other surfaces on which the user is operating the hybrid computer. Some hybrid computers have a keyboard in a first portion of the computer and a touch-sensitive display in a second portion of the computer, where the first portion and the second portion are connected by a hinge.

Conventional hinges have a single pivot point, limiting the geometries at which the first portion and second portion may be positioned. Some conventional hinges will not allow the first portion and second portion to be oriented at greater than 180°. Other multiple pivot hinges allow for motion of the first portion and second portion of the hybrid computer past 180°, but provide no control over which pivot point within the hinge is active during the movement of the hinge.

A multiple pivot hinge with indeterminant motion does not control an active hinge, resulting in possible damage to the hybrid computer through rotation of a pivot point beyond 270°, rotation of a pivot point with a pinched or kink wire, and flexion of a keyboard or touch-sensitive surface when part of the first portion or second portion of the hybrid computer is not flat on the table or other surfaces.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In an embodiment, a hinge system includes a first body, a second body, a first pivot point, a second pivot point, and a first lock that shares the first pivot point with the first body and the second pivot point with the second body. The first lock includes a first cam, a second cam, and a follower. The first cam is connected to the first body and has a first cam surface. The first cam is rotatable about the first pivot point. The second cam is connected to the second body and has a second cam surface. The second cam is rotatable about the second pivot point. The follower is movable relative to the first cam and the second cam, the follower configured to be received by the first cam surface and the second cam surface.

In another embodiment, an electronic device includes a first body including a first electronic component, a second body including a second electronic component in data or electronic communication with the first electronic component, and a hinge positioned between the first body and second body and configured to allow the first body to move relative to the second body. The hinge includes a first pivot point, a second pivot point, and a first lock that shares the first pivot point with the first body and the second pivot point with the second body. The first lock includes a first cam, a second cam, and a follower. The first cam is connected to the first body and has a first cam surface. The first cam is rotatable about the first pivot point. The second cam is connected to the second body and has a second cam surface. The second cam is rotatable about the second pivot point. The follower is movable relative to the first cam and the second cam, the follower configured to be received by the first cam surface and the second cam surface.

In yet another embodiment, a method for providing determinant motion with a hinge includes rotating a first cam about a first pivot point through a first angular rotation in a first direction; locking the first pivot point; unlocking a second pivot point; and rotating a second cam about the second pivot point through a second angular rotation in the first direction after unlocking the second pivot point.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 1-2 is a perspective exploded view of the cam lock hinge of FIG. 1-1;

FIG. 2 is a side schematic view of an embodiment of a device with a cam lock hinge, according to the present disclosure;

DETAILED DESCRIPTION

Figure 1:
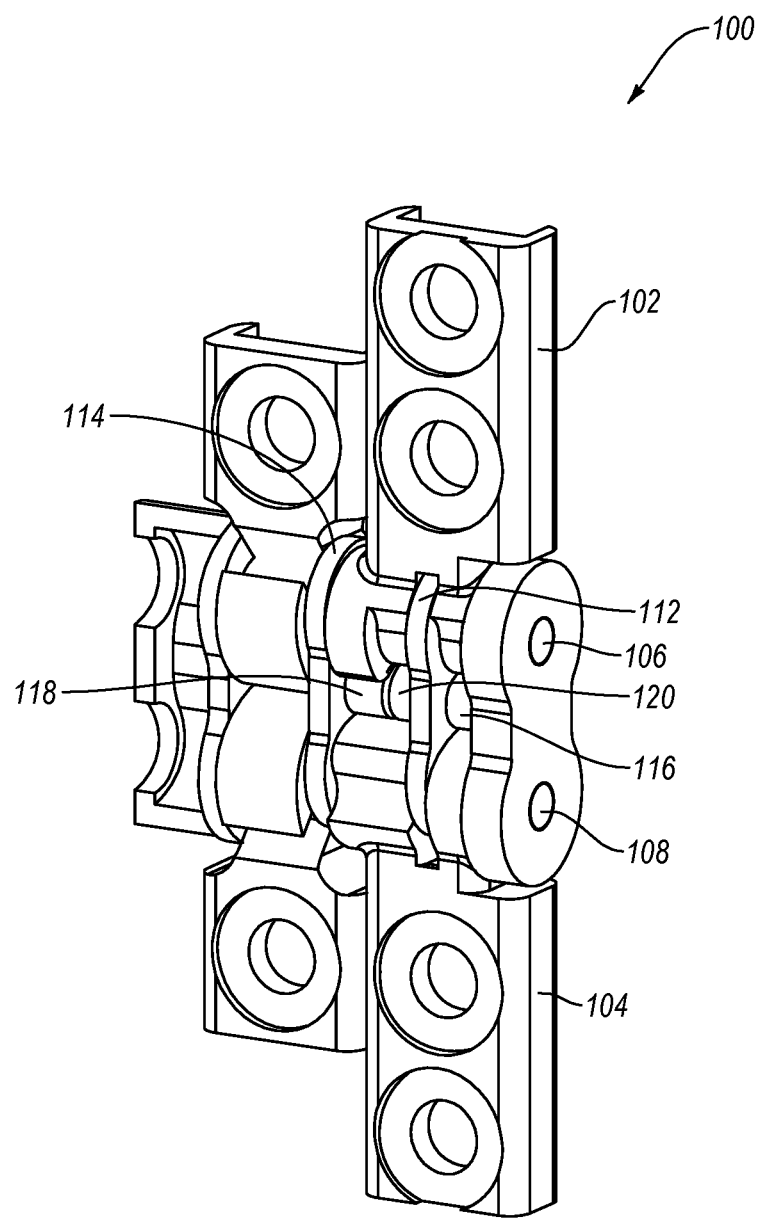
FIG. 1-1 is a perspective view of an embodiment of a cam lock hinge having a dynamic pivot point, according to the present disclosure.

This disclosure generally relates to locking apparatuses, systems, and methods. More particularly, this disclosure generally relates to locking apparatuses, systems, and methods for securing computing devices.

A hinge for an electronic device may have a plurality of pivot points. The hinge may pivot at only one of the pivot points at a time. At any given time, at least one of the pivot points may be locked, such that application of force to a side of the hinge may result in only one of the pivot points rotating at a time. The controlled movement of specific pivot points in the hinge is known as determinant motion. At any given position of the hinge, only one pivot point may be free to rotate.

By controlling the location of the active pivot point and the locked pivot point in the hinge, the location and relative position of a first side of the hinge and a second side of the hinge may be controlled. For example, a laptop having a hinge with fully determinant motion according to the present disclosure may move from a closed position (e.g., a 0° relationship between the screen and the keyboard of the laptop) to an open position (e.g., a 90° relationship between the screen and the keyboard of the laptop) with rotation only about a first pivot point. Movement of the hinge beyond the 90° position may lock the first pivot point and unlock the second pivot point, such that force applied to the hinge rotates about the second pivot point up to a flat position (e.g., a 180° relationship between the screen and the keyboard of the laptop).

In some embodiments, movement of the hinge beyond the flat position (i.e., the 180° position) may continue about the second pivot point up to a 270° position, at which point, the second pivot point may lock. Movement of the hinge beyond the 270° position toward a 360° may unlock the first pivot point, allowing continued rotation about the first pivot point.

Determinant motion up to 90° may ensure that the active pivot point is positioned to extend the footprint of the device. For example, stability of a laptop or other clamshell device may be at least partially based on how large the dimensions of the device's footprint are. When the portion of the hinge between the first pivot point and the second pivot point can be positioned in line with the first body of the device (e.g., the keyboard of a laptop), the base upon which the device rests becomes larger and the center of mass of the device is lower than if the active pivot point is the second pivot point nearer the second body of the device (e.g., the display of a laptop).

Determinant motion up to 180° may ensure that the device may move from a clamshell configuration at a 0° position to a fully flat configuration predictably and reliably. For example, a hybrid laptop may have a touch-sensitive display or surface incorporated into one or both bodies of the device. Applying force or pressure to the touch-sensitive surface without being flat against a table or other supporting surfaces may flex or damage the laptop or the hinge.

Determinant motion up to 270° may ensure that the footprint is larger than the area of the first body or second body alone, and that the center of mass is comparatively lower. For example, a hybrid laptop may be used in a display fashion with the display oriented outward with the keyboard facing downward for viewing of videos, use with an external keyboard, use with a dock station, or other applications not necessitating the keyboard.

Determinant motion up to 360° may allow the inversion of the device about the hinge without either hinge ever exceeding 180° from the original position. In some embodiments, the hinge may have one or more wires, cables, or other communication elements that communicate data or electricity across the hinge between the first body of the device and the second body of the device. Ensuring both the first pivot point and second pivot point do not exceed 180° may reduce the likelihood of pinching, stretching, or other damage to the communication members across the hinge.

Figures 1, 2:
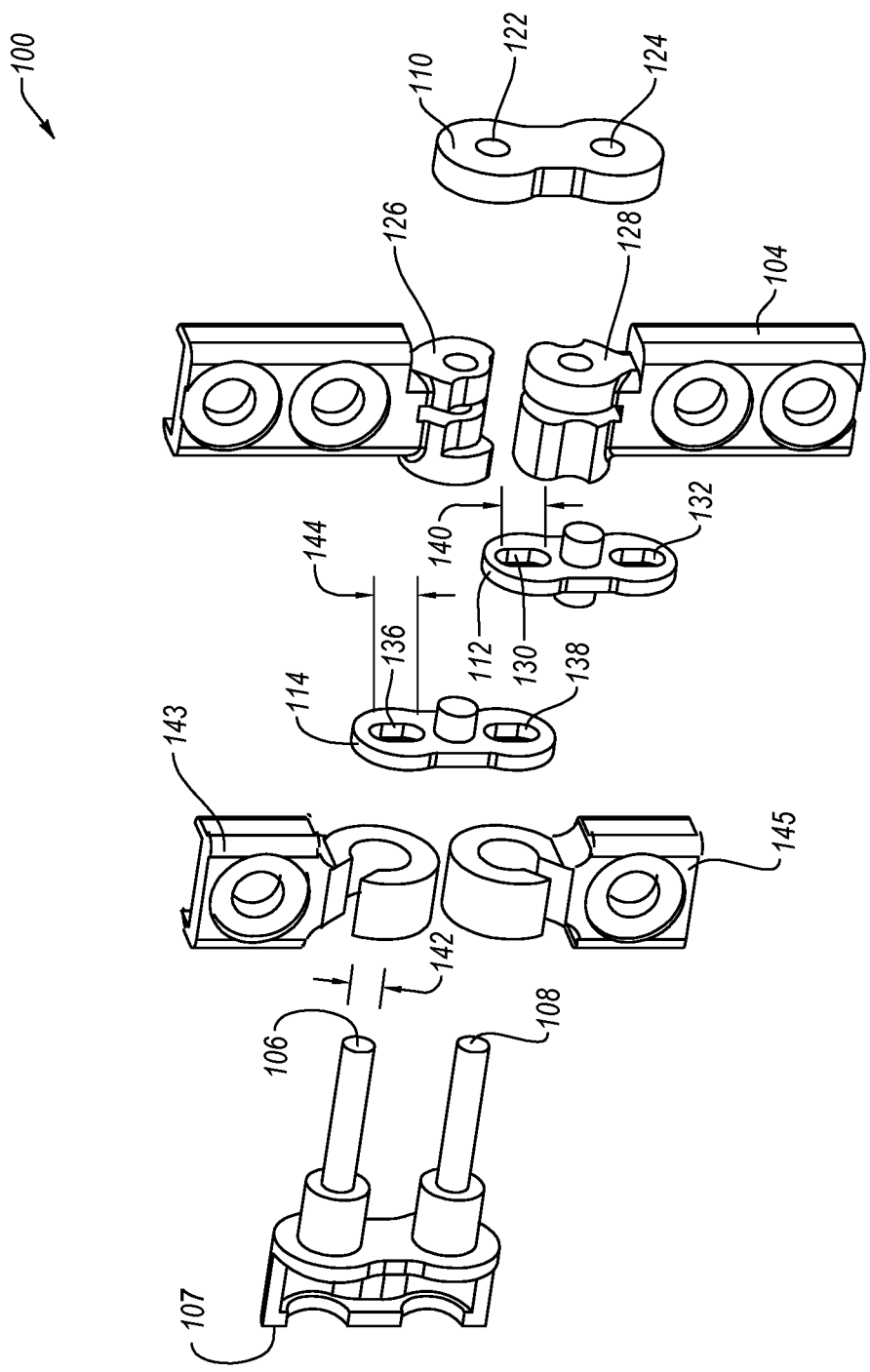
Figure 2:
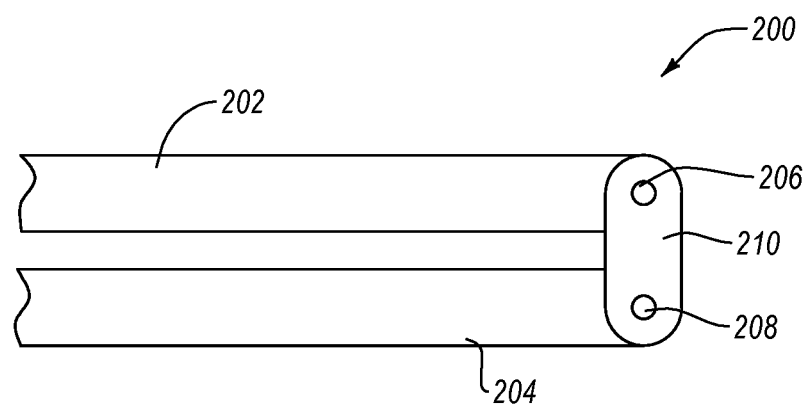

FIG. 1-1 illustrates an embodiment of a hinge 100, according to the present disclosure, that allows for determinant motion and FIG. 1-2 illustrates an exploded view of the hinge 100. FIG. 1-1 shows the hinge 100 connecting a first body 102 and a second body 104 about a first pivot point 106 and a second pivot point 108. In some embodiments, the first body 102 and the second body 104 may be brackets configured to attach to one or more components of a device, such as shown in FIG. 1-1, while in other embodiments, the first body 102 and/or second body 104 may be integrally formed with one or more components of a device, such as the body and/or chassis of a laptop, as shown in FIG. 2.

The distance between the first pivot point 106 and the second pivot point 108 may be held constant during movement of the hinge 100 by a link 110 that receives an axle or other pin through openings 122, 124 to fix the distance of the first pivot point 106 and second pivot point 108 relative to one another.

In some embodiments, the first pivot point 106 and second pivot point 108 may be selectively locked and unlocked by followers carried by sliders that move relative to the first pivot point 106 and second pivot point 108 as the hinge 100 rotates.

In some embodiments, a hinge 100 may include an internal slider 112 and/or an external slider 114. An internal slider 112 may be positioned at least partially within the hinge 100 such that the movement of the internal slider 112 is limited by the first body 102 and/or the second body 104. An external slider 114 may be positioned at least partially externally to the hinge 100 such that the external slider 114 may be moved relative to the first body 102 and/or second body 104 without contacting either of the first body 102 and/or second body 104.

In some embodiments, a slider may carry a follower projecting from the slider, such as follower 116 projecting from the internal slider 112 or follower 118 projecting from the external slider 114. In other embodiments, a slider may carry a plurality of followers, such as followers 116 and opposing follower 120 projecting from the internal slider 112.

As shown in FIG. 1-2, the hinge 100 may include a plurality of cams connected to the first body 102 and the second body 104. The first cam 126 on the first body 102 and second cam 128 on the second body 104 may have a pattern of recesses and/or grooves to allow or urge a follower to move relative to the first pivot point 106 and the second pivot point 108 during use of the hinge 100.

The internal slider 112 is illustrated with a first aperture 130 and a second aperture 132 configured to align with and receive the first pivot point 106 and second pivot point 108, respectively. Similarly, the external slider 114 may have a first aperture 136 and a second aperture 138 that are configured to align with and receive the first pivot point 106 and second pivot point 108, respectively.

The first aperture 130 of the internal slider 112 may have an aperture length 140 that is greater than a diameter 142 of the pin of the first pivot point 106 and/or second pivot point 108. For example, the first aperture 130 and second aperture 132 may be elongated in a direction to allow the movement of the internal slider 112 relative to the first pivot point 106 and the second pivot point 108. In some embodiments, the degree of movement of the internal slider 112 relative to the first pivot point 106 and the second pivot point 108 may be at least partially related to the aperture length 140. For example, the amount of movement of the internal slider 112 (and hence, any followers connected thereto) may be the difference between the aperture length 140 and the diameter 142 of the first pivot point 106 and second pivot point 108. In other embodiments, the stroke of the slider shall be determined by the cam rise and fall between the two halves of the hinge. The width of the aperture shall be only slightly larger than the diameter of the pins that go through the apertures. This ensures a single degree of translational freedom for the sliders. In some embodiments, the external slider 114 may have an aperture length 144 that is substantially equal to that of the internal slider 112. In other embodiments, the external slider 114 may have an aperture length 144 that is greater than or less than that of the internal slider 112.

In some embodiments, a communication member 107 may have one or more wires and/or cables extending therethrough or, in other embodiments, provides a direct electrical contact through which the hinge 100 may have electrical communication between the first body 102 and second body 104, or electronic components connected thereto. Data and/or electrical communication through the communication member 107 may allow electricity and/or data to be sent across the hinge 100 between, for example, a display connected to the first body 102 and one or more computing components connected to the second body 104. In some embodiments, the communication member 107 provides electrical communication. In some embodiments, the communication member 107 provides electrical and data communication. In yet other embodiments, the communication member 107 provides data communication without electrical communication, such as via fiber optic cables.

In other embodiments, a first communication member and second communication member may be positioned in the hinge 100. The first communication member and second communication member may have one or more wires and/or cables extending between them or, in other embodiments, a direct electrical contact between the first communication member and second communication member may allow electrical communication between the first communication member and second communication member. Data and/or electrical communication through the first communication member and second communication member may allow electricity and/or data to be sent across the hinge 100 between, for example, a display connected to the first body 102 and one or more computing components connected to the second body 104.

In some embodiments, a hinge 100 may include one or more frictional elements to hold the hinge 100 in a given position, such as when using a laptop screen at 135° from the keyboard, or when using a laptop in a "tent" configuration for display of video or other imagery. In the embodiment shown in FIG. 1-2, a first frictional element 143 applies a first frictional force to the first pivot point 106 and a second frictional element 145 applies a second frictional force to the second pivot point 108.

In some embodiments, such as shown in FIG. 2, a hinge 200 may connect a first body 202 of an electronic device to a second body 204 of the electronic device. For example, the first body 202 may house a display, such as a touchscreen display while the second body 204 may house one or more computing components, such as a CPU, a GPU, one or more storage devices, one or more input devices, a power supply, or other computing components that may be configured to communicate with (e.g., receive information from, send information to, or send power to) the display in the first body 202.

The hinge 200 may have a closed position with the first body 202 and second body 204 oriented at a substantially 0° relationship to one another. While the present disclosure describes the operation of a hinge between 0° and 360°, it should be understood that in other embodiments, a hinge according to the present disclosure may be configured to operate within any range from 0° to 360°, such as 0° to 180°, 30° to 120°, 45° to 315°, or any other range of angles between the first body and second body.

The hinge 200 may pivot around a first pivot point 206 and a second pivot point 208 with a link 210 between the first pivot point 206 and second pivot point 208. The link 210 may be any length to provide sufficient clearance between the first body 202 and second body 204 during operation of the hinge 200.

Figure 3:
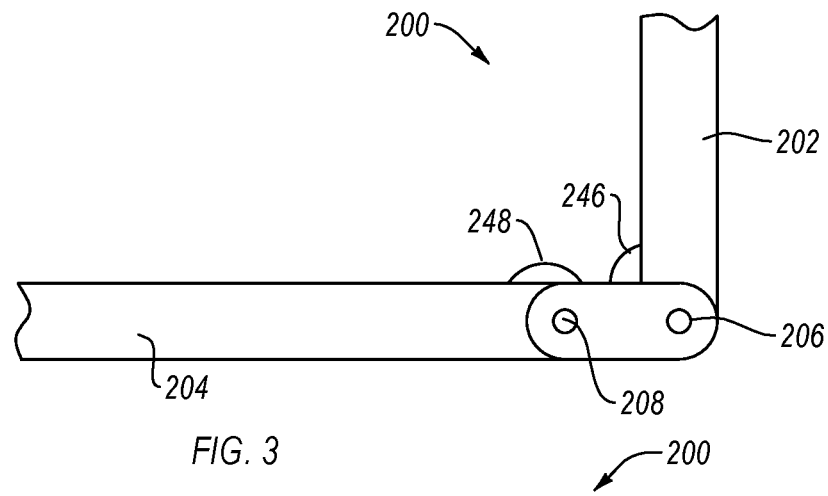
FIG. 3 is a side schematic view of the embodiment of a device with a cam lock hinge of FIG. 2 open to 90°.

FIG. 3 illustrates the embodiment of a hinge 200 of FIG. 2 rotated about the second pivot point 208 such that the first body 202 and the second body 204 are oriented at a 90° relationship to one another. The first pivot point 206 may be locked at a first pivot point angle 246 during movement of the second pivot point 208 until the second pivot point reaches a second pivot point angle 248 of 180°. The initial rotation about the second pivot point 208 may extend the footprint of the electronic device by effectively adding the length of the link 210 to the second body 204. This may allow the electronic device to be more stable compared to a hinge with indeterminant motion or a hinge that rotates about the first pivot point 206 before the second pivot point 208.

Figure 4:
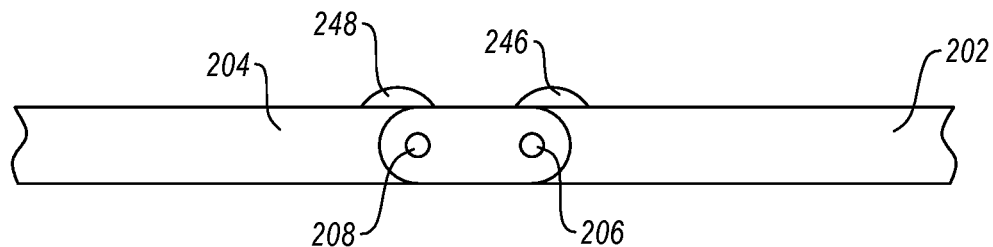
FIG. 4 is a side schematic view of the embodiment of a device with a cam lock hinge of FIG. 2 open to 180°.

When the second pivot point angle 248 reaches 180°, the second pivot point 108 may lock and the first pivot point 206 may unlock. The hinge 200 may then rotate about the first pivot point 206 until the first pivot point angle 246 reaches 180°, as shown in FIG. 4. The first body 202 and the second body 204 may lie in a single plane with the second pivot point 208 locked at a second pivot point angle of 180° and the first pivot point 206 free to rotate. In other embodiments, the first pivot point 206 may lock upon the first pivot point angle 246 reaching 180°, and the second pivot point 208 may unlock.

It should be understood that in some embodiments, the first pivot point 206 or the second pivot point 208 is a friction hinge. For example, a greater amount of force may be applied to the hinge 200 to move the hinge 200 about the first pivot point 206 than an amount of force needed to move the hinge 200 about the second pivot point 208. In other examples, a greater amount of force may be applied to the hinge 200 to move the hinge 200 about the second pivot point 208 than an amount of force needed to move the hinge 200 about the first pivot point 206.

Figure 5:
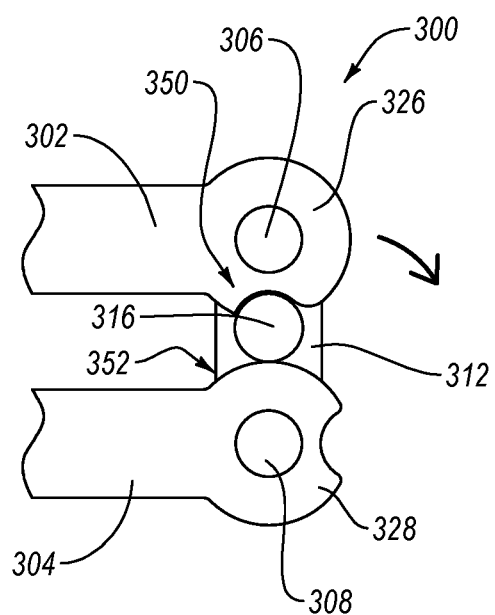
FIG. 5 is a side cutaway schematic view of another embodiment of a device with a cam lock hinge having a locked pivot point, according to the present disclosure.

FIG. 5 through FIG. 8 illustrate an embodiment of a hinge 300 that provides determinant motion up to 180° as illustrated in FIG. 2 through 4. FIG. 5 illustrates the hinge 300 in the closed configuration with a first body 302 and a second body 304 at a 0° orientation from one another. The first body 302 is movable about a first pivot point 306 and the second body 304 is movable about a second pivot point 308.

In FIG. 5, the first pivot point 306 is locked by the follower 316 protruding from the internal slider 312. The first body 302 cannot rotate about the first pivot point 306 because the first cam 326 has a cam surface 350 thereon, and the follower 316 is positioned in the cam surface 350. The follower 316 (and associated internal slider 312) may be moveable relative to the first pivot point, but the second cam 328 is positioned to limit and/or prevent movement of the follower 316.

Figure 6:
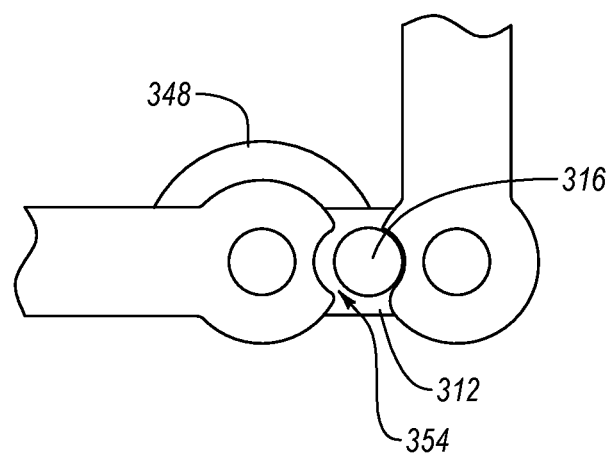
FIG. 6 is a side cutaway schematic view of the embodiment of a device with a cam lock hinge of FIG. 5 open to 90°.

The hinge 300 may move about the second pivot point 308 as the follower 316 may move along the outer surface 352 of the second cam 328 until the second pivot point angle 348 reaches 180°, as shown in FIG. 6. Once the second pivot point angle 348 reaches 180°, the follower 316 may align with the cam surface 354 of the second cam 328. The cam surface 354 of the second cam 328 may provide clearance for the follower 316 and associated internal slider 312 to move relative to the pivot points 306, 308.

Figure 7:
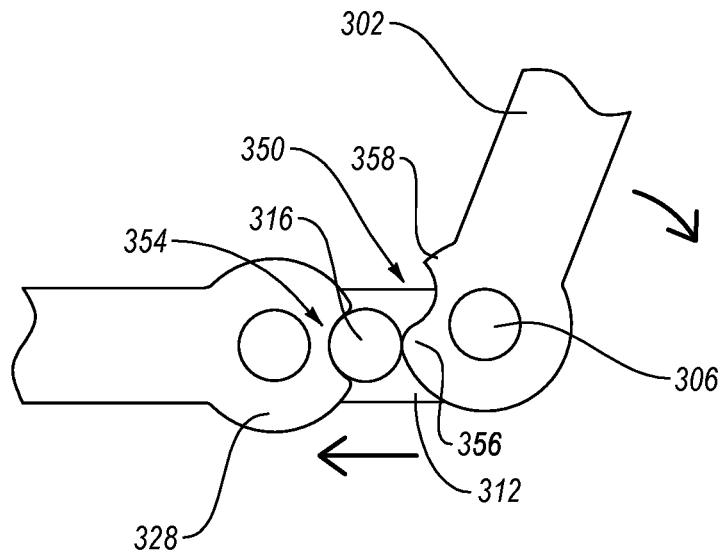
FIG. 7 is a side cutaway schematic view of the embodiment of a device with a cam lock hinge of FIG. 5 moving a follower.
Figure 8:
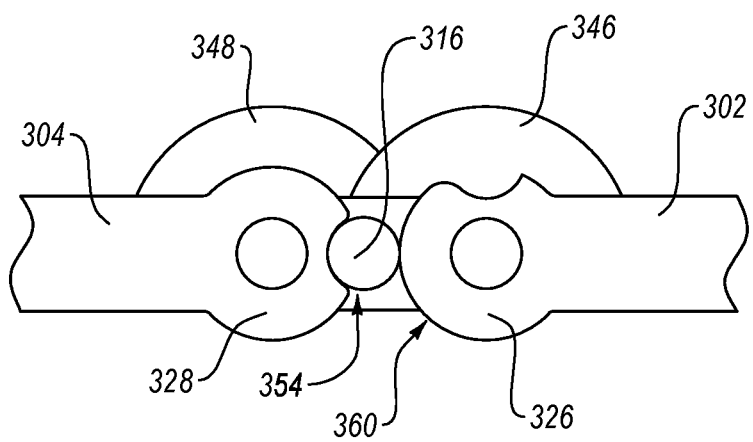
FIG. 8 is a side cutaway schematic view of the embodiment of a device with a cam lock hinge of FIG. 5 open to 180°.

FIG. 7 illustrates the movement of the first body 302 about the first pivot point 306 urging the follower 316 and associated internal slider 312 toward the second cam 328. The cam surface 350 of the first cam 326 has a release edge 358 and a drive edge 356. The release edge 358 is configured to limit and/or prevent rotation of the first cam 326 relative to the follower 316 when the follower 316 is positioned in the cam surface 350 of the first cam 326. The drive edge 356 is rounded to facilitate the movement of the follower 316 away from the first cam 326 when the first cam 326 rotates about the first pivot point 306. For example, when the follower 316 is aligned with the cam surface 354 of the second cam 328, the drive edge 356 of the first cam 326 may urge the follower 316 toward the second cam 328 upon rotation of the first cam 326. The release edge 358 may rotate away from the follower 316.

The drive edge 356 may be rounded such that the drive edge 356 remains in contact with the follower 316 through an amount of rotation of the first cam 326 about the first pivot point 306. In some embodiments, the first cam 326 may rotate about the first pivot point 306 up to 45° before the drive edge 356 passes the follower 316. In other embodiments, the first cam 326 may rotate about the first pivot point 306 up to 40° before the drive edge 356 passes the follower 316. In yet other embodiments, the first cam 326 may rotate about the first pivot point 306 up to 30° before the drive edge 356 passes the follower 316. In at least one embodiment, the first cam 326 may rotate about the first pivot point 306 up to 20° before the drive edge 356 passes the follower 316.

After the follower 316 and associated internal slider 312 moves relative to the pivot points, the follower 316 may be received by the cam surface 354 of the second cam 328 and the follower 316 may no longer limit the rotation of the first cam 326 about the first pivot point 306, unlocking the first pivot point 306 and allowing the first body 302 and first cam 326 to rotate freely with the follower 316 adjacent an outer surface 360 of the first cam 326. The first body 302 and first cam 326 may rotate until the first pivot point angle 346 is 180° and the first body 302 and second body 304 lie in a single plane.

The embodiment depicted in FIG. 5 through FIG. 8 provides determinant motion from a 0° to 180° orientation of the first body and second body of the hinge by use of a single lock. In other embodiments, a hinge according to the present disclosure may have more than two cams and/or more than one follower to provide a plurality of locks. A plurality of locks may provide determinant motion over a larger range of orientations and/or in both rotational directions of the hinge.

Figure 9:
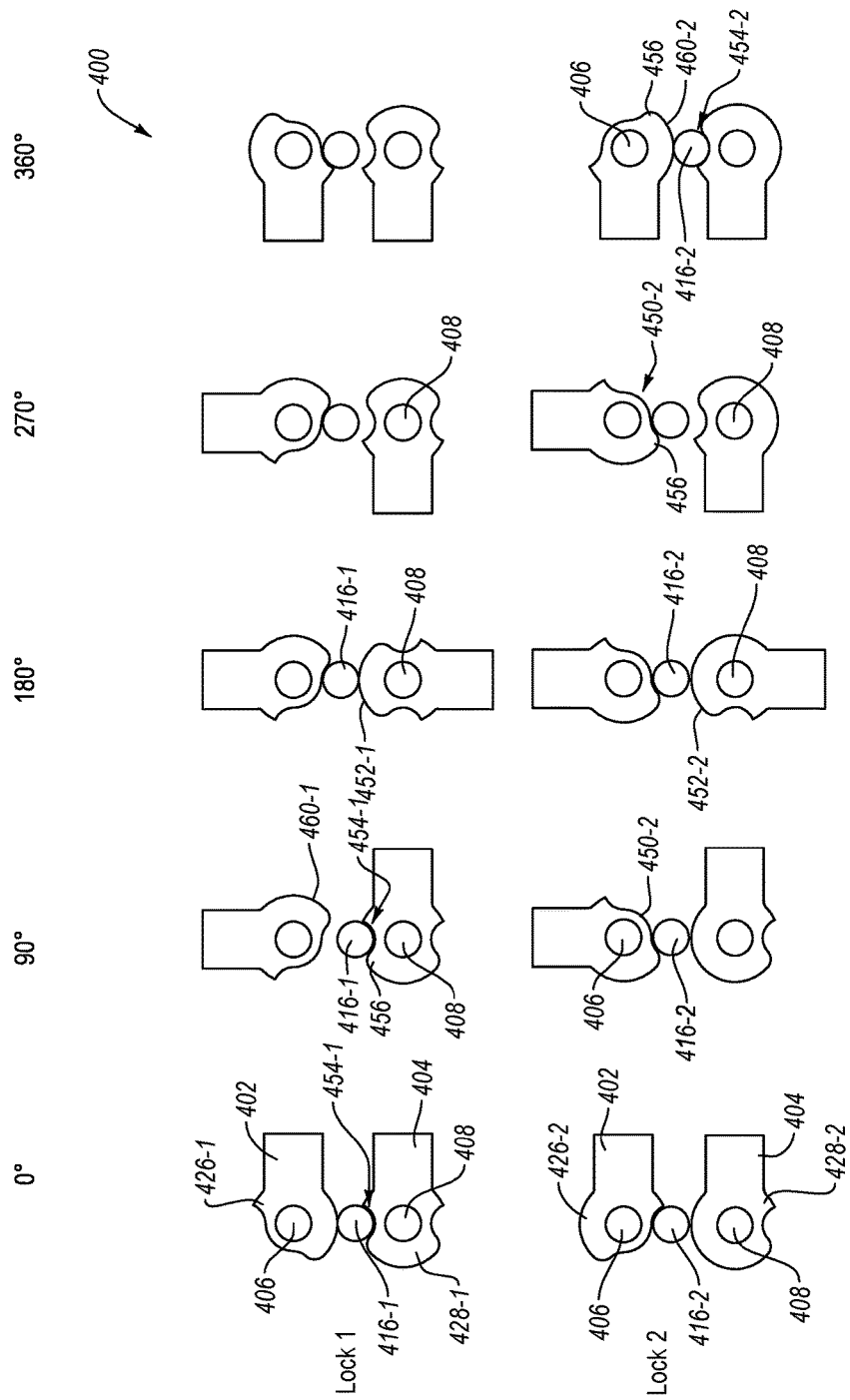
FIG. 9 is a matrix of slider positions and cams of an embodiment of a cam lock hinge with two sliders and two followers, according to the present disclosure.

FIG. 9 illustrates a matrix of hinge orientations and lock positions of cams and followers for each lock. A lock may include two cams and a follower. The cams may each include one or more cam surfaces. A cam surface may be a recess in the outer surface of the cam that receives the follower. In some embodiments, a cam surface may be configured to prevent rotation of the cam in both directions when the follower is positioned at the cam surface. In other embodiments, the cam surface may be configured to prevent rotation outside a rotational range. For example, a cam surface may be a recess in the outer surface of the cam that extends 90° around the cam. In other examples, the cam surface may be a recess in the outer surface that extends around less than 90° of the cam. In yet other examples, the cam surface may be a recess in the outer surface that extends around more than 90° of the cam.

As shown in FIG. 9, the hinge 400 may include two locks that are both connected to the first body 402 and the second body 404. Lock 1 and Lock 2 may both pivot about the first pivot point 406 and second pivot point 408, which are shared between the two locks. For example, when the hinge 400 rotates the first body 402 about the first pivot point 406 between the 0° position and the 90° position, both Lock 1 and Lock 2 rotate about the first pivot point 406. Lock 1 and Lock 2 may cooperate to provide determinant motion from 0° to 360°.

Lock 1 includes a first cam 426-1 and a second cam 428-1 with a follower 416-1 positioned therebetween. Lock 2 includes a first cam 426-2 and a second cam 428-2 with a follower 416-2 positioned therebetween. The cam surfaces of Lock 1 may be different from the cam surfaces of Lock 2 such that the Lock 1 and Lock 2 are alternatively locked or unlocked such that the hinge 400 is free to rotate about only one of the first pivot point 406 or the second pivot point 408 at any time.

For example, in the 0° position, the second pivot point 408 is locked by the follower 416-1 positioned against the cam surface 454-1 of the second cam 428-1 of Lock 1 (and the follower 416-1 is unable to move due to the first cam 426-1). Because the second cam 428-1 of Lock 1 is unable to move relative to the second pivot point 408, the second cam 428-2 of Lock 2 is also unable to move relative to the second pivot point 408. The hinge 400, therefore, only has one degree of movement.

The hinge 400 may move to the 90° position by rotating the first cam 426-1, 426-2 about the first pivot point 406. After a 90° rotation, the cam surface 450-2 of the first cam 426-2 of Lock 2 contacts the follower 416-2, and the first pivot point 406 becomes locked. During the rotation of the first cam 426-1 of Lock 1 from 0° to 90°, the follower 416-1 is adjacent to the outer surface 460-1 of the first cam 426-1 until the 90° position is reached. After being rotated 90°, the first cam 426-1 of Lock 1 may allow the follower 416-1 of Lock 1 to move toward the first cam 426-1.

The cam surface 454-1 of the second cam 428-2 of Lock 1 may have a drive edge 456 that urges the follower away from the second cam 428-2 and toward the first cam 426-1, unlocking the second pivot point 408, and allowing the second cams 428-1, 428-2 to rotate relative to the second pivot point 408. The hinge 400 may then move to the 180° position and the hinge 400 may lie in a single plane.

At the 180° position, the second pivot point 408 is still unlocked, and the outer surfaces 452-1, 452-2 of the second cams 428-1, 428-2 may continue to the move past the followers 416-1, 416-2 until the hinge 400 reaches the 270° position.

At the 270° position, rotation of the first cams 426-1, 426-2 about the first pivot point 406 causes the drive edge 456 of the cam surface 450-2 of first cam 426-2 of Lock 2 to urge the follower 416-2 of Lock 2 toward the second cam 428-2. The second pivot point 408 will lock upon movement of the follower 416-2 against the cam surface 454-2 and the drive edge 456 will move past the follower 416-2, such that the hinge 400 may rotate about the first pivot point 406, with the outer surface 460-2 of the first cam 426-1 of Lock 2 moving past the follower 416-2 of Lock 2.

Figure 10:
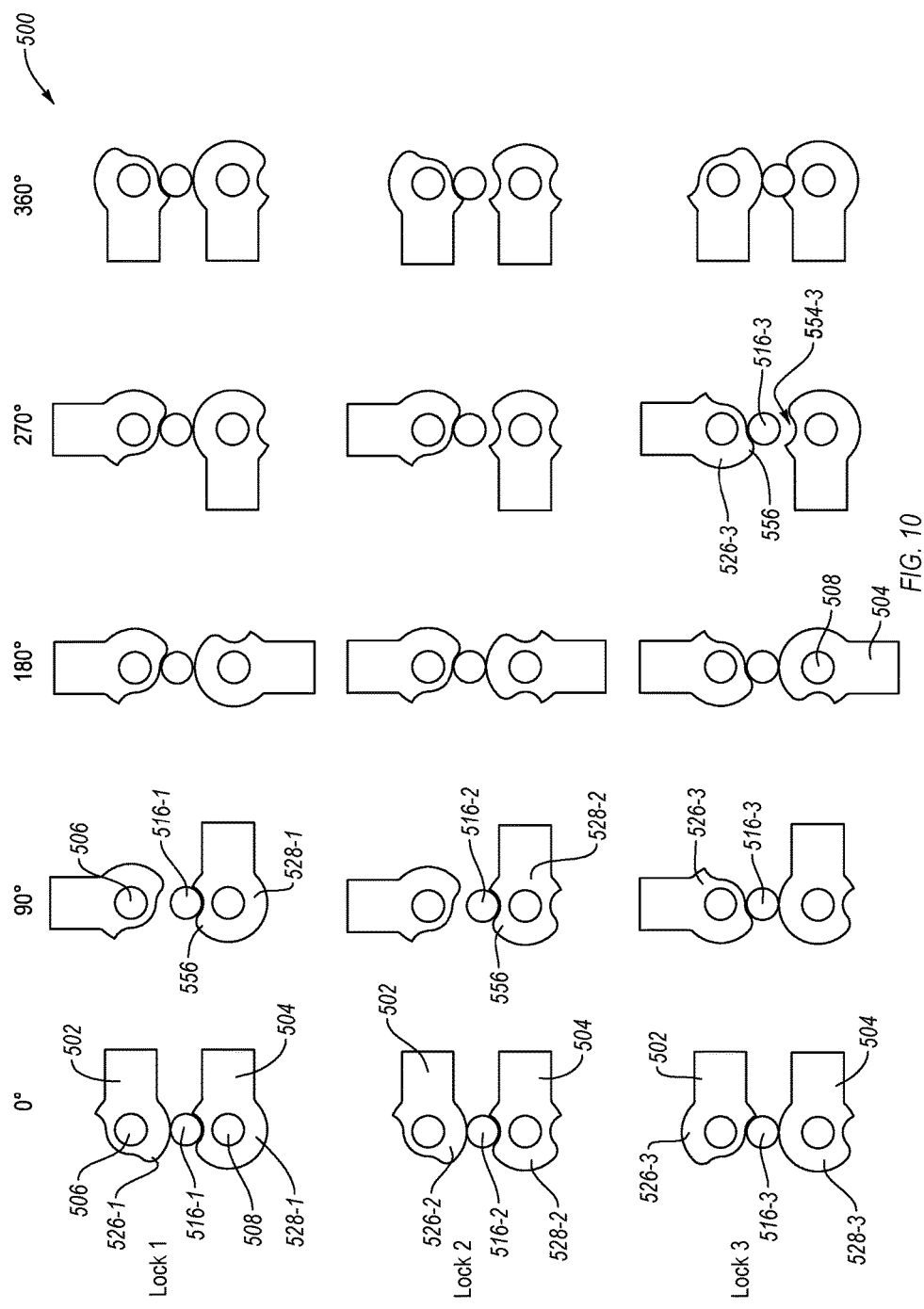
FIG. 10 is a matrix of slider positions and cams of an embodiment of a cam lock hinge with two sliders and three followers, according to the present disclosure.

FIG. 10 illustrates an embodiment of a hinge 500 having three locks, according to the present disclosure. Each of Lock 1, Lock 2, and Lock 3 include a first cam 526-1, 526-2, 526-3 and a second cam 528-1, 528-2, 528-3 with a follower 516-1, 516-2, 516-3 positioned therebetween. The first body 502 and second body 504 are common to each of the three locks and each of the three locks share the first pivot point 506 and second pivot point 508.

At the 0° position, the first pivot point 506 is unlocked and the first cam 526-1, 526-2, 526-3 of all three locks is free to rotate about the first pivot point 506 until the first cam 526-3 of Lock 3 contacts the follower 516-3 at the 90° position. At the 90° position, the first pivot point 506 then becomes locked and the drive edge 556 of the second cams 528-1, 528-2 of Lock 1 and Lock 2 may then urge the followers 516-1, 516-2 of Lock 1 and Lock 2 toward the first pivot point 506 to unlock the second pivot point 508.

At the 180° position, the second pivot point 508 remains unlocked and the second body 504 is free to move about the second pivot point 508 until the 270° position. At the 270° position, the follower 516-3 of Lock 3 may be in contact with the drive edge 556 of the first cam 526-3, and rotation about the first pivot point 506 results in the drive edge 556 urging the follower 516-3 against the cam surface 554-3 of the second cam 528-3 of Lock 3. The second pivot point 508 is then locked and the first pivot point 506 unlocked to allow the hinge 500 to move to the 360° position.

The process may be reversed, as the hinge 500 provides determinant motion from the 360° position back to the 0° position. For example, the 360° position has the second pivot point 508 locked at Lock 3 until the 270° position. The drive edge 556 of the second cam 528-3 of Lock 3 then moves the follower 516-3 toward the first cam 526-3 to unlock the second pivot point 508 from the 270° position to the 90° position.

Movement of the hinge 500 from the 90° position to the 0° position causes the drive edge 556 of the first cams 526-1, 526-2 of Lock 1 and Lock 2 to urge the followers 516-1, 516-2 toward the second cams 528-1, 528-2. Movement of followers 516-1, 516-2 toward the second cams 528-1, 528-2 locks the second pivot point 508 at Lock 1 and Lock 2 and the hinge 500 moves about the first pivot point 506 to the 0° position.

Figure 11:
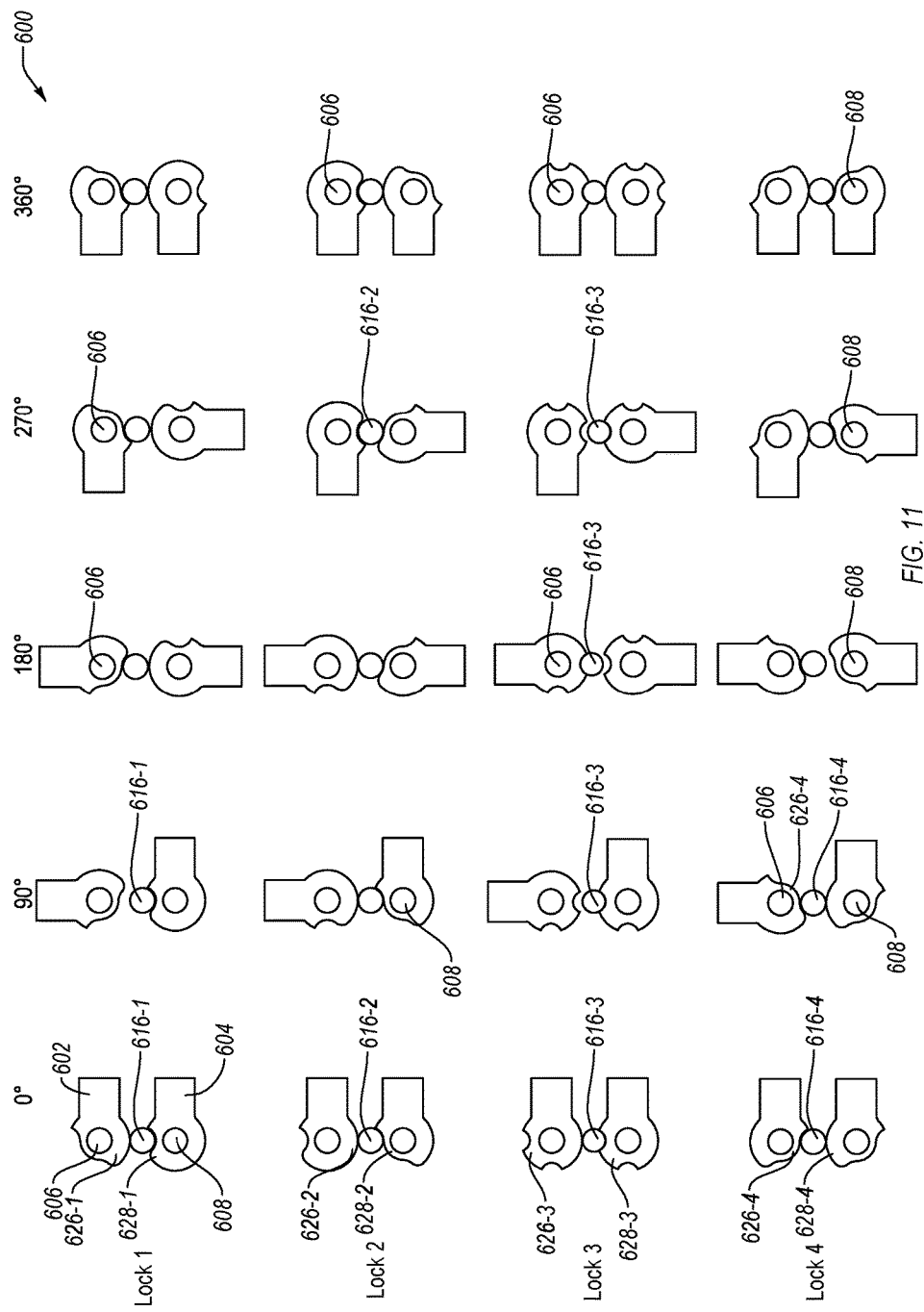
FIG. 11 is a matrix of slider positions and cams of an embodiment of a cam lock hinge with three sliders and four followers, according to the present disclosure.

FIG. 11 is a matrix of lock positions for an embodiment of a hinge 600, according to the present disclosure. The hinge 600 includes four locks: Lock 1, Lock 2, Lock 3, and Lock 4. Each of the locks includes a first cam 626-1, 626-2, 626-3, 626-4 and a second cam 628-2, 628-3, 628-3, 628-4 with a follower 616-1, 616-2, 616-3, 616-4 positioned therebetween.

Similar to the embodiments of hinges 400, 500 described in relation to FIG. 9 and FIG. 10, the locks all share a first body 602 and second body 604, as well as a first pivot point 606 and second pivot point 608.

The hinge 600 is locked about the second pivot point 608 by Lock 1 and Lock 3. The hinge 600 is free to move about the first pivot point 606 up to the 90° position, at which point, Lock 4 locks the first pivot point 606. As the hinge moves from the 90° position toward the 180° position, the followers 616-1, 616-3 of Lock 1 and Lock 3 move, unlocking the second pivot point 608 and allowing the hinge 600 to move to the 180° position.

At the 180° position when moving toward the 270° position, the follower 616-4 of Lock 4 moves toward the second cam 628-4 and the follower 616-3 of Lock 3 moves again, unlocking the first pivot point 606 and locking the second pivot point 608.

At the 270° position, the followers 616-2, 616-3 move again, unlocking the second pivot point 608 and locking the first pivot point 606 until the 360° position. Similar to FIG. 10, the process may be reversed to provide fully determinant motion from the 0° position to the 360° position in either direction of the hinge 600.

Figure 12:
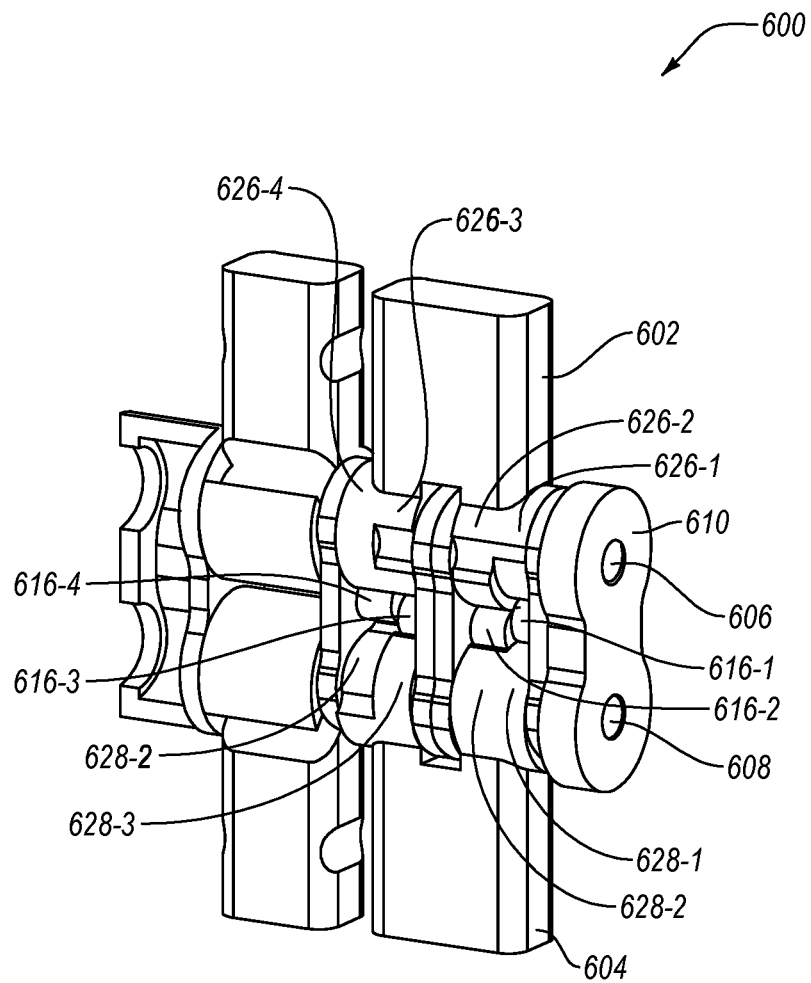
FIG. 12 is a perspective view of another embodiment of a cam lock hinge, according to the present disclosure.

The embodiment of a hinge 600 of FIG. 11 is shown in an assembled form in FIG. 12. The hinge 600 has the four locks in parallel positioned between the first body 602 and the second body 604. The four locks each include a first cam 626-1, 626-2, 626-3, 626-4 and a second cam 628-1, 628-2, 628-3, 628-4 with a follower 616-1, 616-2, 616-3, 616-4 therebetween. The first pivot point 606 and second pivot point 608 are held fixed relative to one another by a link 610 that does not slide relative to the first body 602 and/or second body 604.

Figure 13:
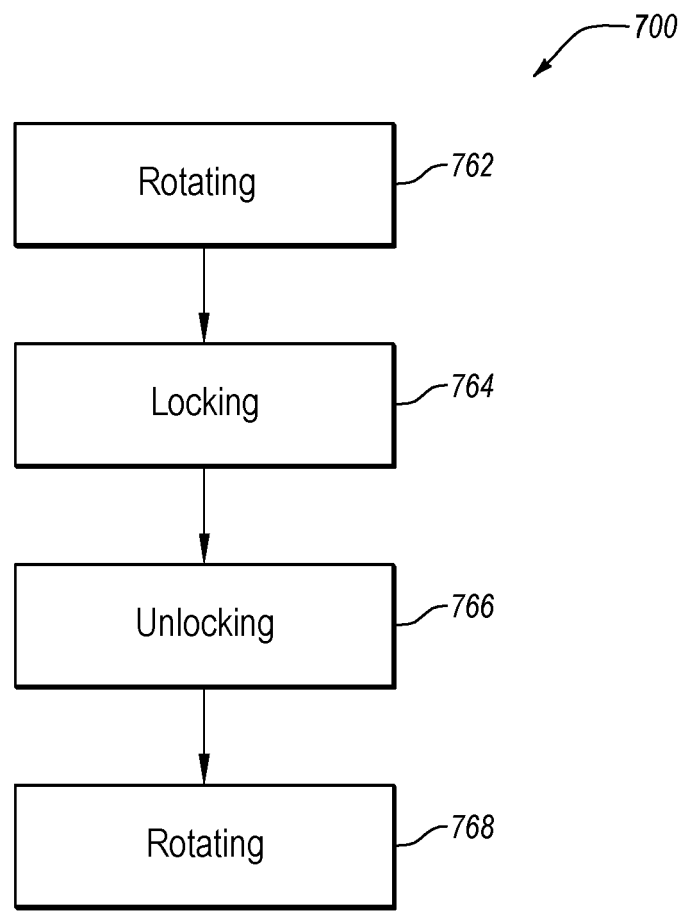
FIG. 13 is a flowchart illustrating an embodiment of a method of determinant motion in a cam lock hinge.

FIG. 13 is a flowchart 700 illustrating an embodiment of a method of selecting an active pivot point in a hinge for determinant motion, such as those described in the present disclosure. The method includes rotating 762 a first cam through a first angular rotation about a first pivot point. The first cam may rotate through any amount of angular rotation. In at least one example, the first angular rotation about the first pivot point is 90°. In at least one other example, the first angular rotation about the first pivot point is 180°.

After rotating 762 the first cam through a first angular rotation, the method includes locking 764 the first pivot point and unlocking 766 a second pivot point. In some embodiments, locking 764 the first pivot point and/or unlocking 766 the second pivot point includes moving a follower. For example, locking 764 the first pivot point and/or unlocking 766 the second pivot point may include urging a follower away from the first cam and toward a second cam with a drive edge of the first cam. In another example, locking 764 the first pivot point and/or unlocking 766 the second pivot point may include urging a follower away from the second cam and toward the first cam with a drive edge of the second cam.

After unlocking 766 the second pivot point, the method further includes rotating 768 the second cam about the second pivot point through a second angular rotation. The second cam may rotate through any amount of angular rotation. In at least one example, the second angular rotation about the second pivot point is 90°. In at least one other example, the second angular rotation about the second pivot point is 180°.

In other embodiments, the method further includes locking the second pivot point after rotating 768 through the second angular rotation, unlocking the first pivot point, and rotating the first cam through a third angular rotation. In at least one example, the third angular rotation about the first pivot point is 90°. In at least one other example, the third angular rotation about the first pivot point is 180°. In some embodiments, the third angular rotation is in the same direction as the first angular rotation. In other embodiments, the third angular rotation is in the opposite direction as the first angular rotation. For example, the third angular rotation may rotate the first cam back toward an original position of the first cam.

In at least one embodiment, the first angular rotation is 90° in a first direction, the second angular rotation is 180° in the first direction, and the third angular rotation is 90° in the first direction.

In yet further embodiments, the method further includes locking the first pivot point after rotating through the third angular rotation, unlocking the second pivot point, and rotating the second cam through a fourth angular rotation. In an example, the fourth angular rotation about the second pivot point is 90°. In at least one other example, the third angular rotation about the first pivot point is 180°.

In at least one embodiment, the first angular rotation is 90° in a first direction, the second angular rotation is 90° in the first direction, the third angular rotation is 90° in the first direction, and the fourth angular rotation is 90° in the first direction.

One or more components of the embodiments described herein may be provided in a kit or in any combinations. For example, the hinge 600 of FIG. 12 may be provided with the first body 202 and second body 204 of the electronic device of FIG. 2.

In at least one embodiment of a hinge according to the present disclosure, the hinge provides determinant motion from a 0° position of a first body and a second body to a 90° position of the first body and the second body, where the second body is in plane with a link of the hinge. In at least another embodiment of a hinge according to the present disclosure, the hinge provides determination motion from a 0° position of a first body and a second body to a 180° position of the first body and second body, wherein the first body and second body lie in a single plane. In at least a third embodiment of a hinge according to the present disclosure, the hinge provides determination motion from a 0° position of a first body and a second body to a 270° position of the first body and the second body, where the second body is in plane with a link of the hinge. In at least a fourth embodiment of a hinge according to the present disclosure, the hinge provides determination motion from a 0° position of a first body and a second body to a 360° position of the first body and the second body.

Providing determination motion through the range of movement of a hinge in an electronic device, according to the present disclosure, allows one to extend the footprint of the device and lower the center of mass, thereby increasing the stability of the device. Determinant motion to a 180° position of the first body and second body, wherein the first body and second body lie in a single plane, allows the device to reliably be used flat on a table or other surface without concerns of flexing a screen, an electronic component, or the chassis of the device due to a portion of the hinge raising the first body relative to the second body. In at least one embodiment, determine motion through the range of movement of a hinge in an electronic device prevents pinching, rubbing, kinking or other damage to electrical and/or data communication conduits (e.g. wires) that provide electrical and/or data communication across the hinge within the electronic device.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A hinge system for providing determinant motion, the hinge system comprising:
   a first pivot point;
   a second pivot point;
   a first body;
   a second body; and
   a first lock, the first lock including:
      a first cam connected to the first body and having a first cam surface, the first cam rotatable about the first pivot point;
      a second cam connected to the second body having a second cam surface, the second cam rotatable about the second pivot point; and
      a follower movable relative to the first cam of the first lock and the second cam of the first lock, the follower configured to be received by the first cam surface of the first lock and the second cam surface of the first lock;
   a second lock, the second lock including:
      a first cam connected to the first body and having a first cam surface, the first cam rotatable about the first pivot point;
      a second cam connected to the second body having a second cam surface, the second cam rotatable about the second pivot point; and
      a follower movable relative to the first cam of the second lock and the second cam of the second lock, the follower configured to be received by the first cam surface of the second lock and the second cam surface of the second lock; and
   a third lock, the third lock including:
      a first cam connected to the first body and having a first cam surface, the first cam rotatable about the first pivot point;
      a second cam connected to the second body having a second cam surface, the second cam rotatable about the second pivot point; and
      a follower movable relative to the first cam of the third lock and the second cam of the third lock, the follower configured to be received by the first cam surface of the third lock and the second cam surface of the third lock.

2. The hinge system of claim 1, further comprising a fourth lock, the fourth lock having:
   a first cam connected to the first body and having a first cam surface, the first cam rotatable about the first pivot point;
   a second cam connected to the second body having a second cam surface, the second cam rotatable about the second pivot point; and
   a follower movable relative to the first cam of the fourth lock and the second cam of the fourth lock, the follower configured to be received by the first cam surface of the fourth lock and the second cam surface of the fourth lock.

3. The hinge system of claim 1, wherein the first cam surface has a drive edge.

4. The hinge system of claim 1, wherein the first cam surface is positioned along at least 90° of the first cam.

5. The hinge system of claim 1, wherein the first pivot point has a greater frictional coefficient than the second pivot point.

6. The hinge system of claim 1, wherein the first lock provides determinant motion through between 90° and 120°.

7. The hinge system of claim 6, wherein the second lock provides determinant motion through between 180° and 240°.

8. The hinge system of claim 7, wherein the third lock provides determinant motion through between 270° and 360°.

9. An electronic device, the electronic device comprising,
   a first body including a first electronic component;
   a second body including a second electronic component in electrical communication with the first electronic component;
   a hinge positioned between the first body and second body and configured to allow the first body to move relative to the second body, the hinge including:
      a first pivot point;
      a second pivot point; and
      a first lock, the first lock including:
         a first cam connected to the first body and having a first cam surface, the first cam rotatable about the first pivot point;
         a second cam connected to the second body having a second cam surface, the second cam rotatable about the second pivot point; and
         a follower movable relative to the first cam of the first lock and the second cam of the first lock, the follower configured to be received by the first cam surface of the first lock and the second cam surface of the first lock;
      a second lock, the second lock including:
         a first cam connected to the first body and having a first cam surface, the first cam rotatable about the first pivot point;
         a second cam connected to the second body having a second cam surface, the second cam rotatable about the second pivot point; and
         a follower movable relative to the first cam of the second lock and the second cam of the second lock, the follower configured to be received by the first cam surface of the second lock and the second cam surface of the second lock; and
      a third lock, the third lock including:
         a first cam connected to the first body and having a first cam surface, the first cam rotatable about the first pivot point;
         a second cam connected to the second body having a second cam surface, the second cam rotatable about the second pivot point; and
         a follower movable relative to the first cam of the third lock and the second cam of the third lock, the follower configured to be received by the first cam surface of the third lock and the second cam surface of the third lock.

10. The electronic device of claim 9, further comprising a fourth lock, the fourth lock having:
    a first cam connected to the first body and having a first cam surface, the first cam rotatable about the first pivot point;
    a second cam connected to the second body having a second cam surface, the second cam rotatable about the second pivot point; and
    a follower movable relative to the first cam of the fourth lock and the second cam of the fourth lock, the follower configured to be received by the first cam surface of the fourth lock and the second cam surface of the fourth lock.

11. The electronic device of claim 9, wherein the first cam surface has a drive edge.

12. The electronic device of claim 9, wherein the first body or second body is a chassis of the electronic device.

13. The electronic device of claim 9, wherein the hinge further comprises a first communication member and second communication member to provide data or electrical communication across the hinge.

14. The electronic device of claim 9, wherein the first pivot point has a greater frictional coefficient than the second pivot point.

15. A method of providing determinant motion with a hinge, the method comprising:
    rotating a first cam of a first lock about a first pivot point through a first angular rotation in a first direction;
    locking the first cam relative to the first pivot point;
    unlocking a second pivot point; and
    rotating a second cam of a second lock about the second pivot point through a second angular rotation in a second direction after unlocking the second pivot point;
    locking the second cam relative to the second pivot point;
    unlocking the first pivot point; and
    rotating a third cam of a third lock about the first pivot point through a third angular rotation in the first direction after unlocking the first pivot point.

16. The method of claim 15, wherein the first cam is connected to a first body and the second cam is connected to a second body, and wherein rotating the third cam about the first pivot point positions the first body and the second body in a single plane.

17. The method of claim 15, wherein the first angular rotation is 90° and the second angular rotation is 90°.

18. The method of claim 15, wherein the first pivot point has a greater frictional coefficient than the second pivot point.

19. The method of claim 15, wherein the first cam has a first cam surface.

20. The method of claim 19, wherein the first cam surface has a drive edge.

* * * * *